(No Model.)

G. J. CAPEWELL.
VEGETABLE PEELER.

No. 557,188. Patented Mar. 31, 1896.

Witnesses
Scott H. Smith.
E. J. Hyde.

Inventor
George J. Capewell, by
Harry R. Williams
atty.

UNITED STATES PATENT OFFICE.

GEORGE J. CAPEWELL, OF HARTFORD, CONNECTICUT, ASSIGNOR TO THE AMERICAN SPECIALTY COMPANY, OF SAME PLACE.

VEGETABLE-PEELER.

SPECIFICATION forming part of Letters Patent No. 557,188, dated March 31, 1896.

Application filed July 5, 1895. Serial No. 554,915. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Vegetable-Peelers, of which the following is a specification.

The invention relates to the class of articles provided for the use of cooks and their helpers whereby they may remove the skins or jackets of hot vegetables, such as Irish or sweet potatoes, beets, and the like vegetable foods that are cooked with their skins on, without necessitating the contact of the flesh of the hands or fingers with the hot vegetables, thus obviating the burning of the hands or the contact of unclean fingers with the cooked vegetable that is ready to serve.

The object of the invention is to provide an efficient article of this class so simple that it can be readily used by any one, and so plainly constructed that it can be sold cheaply in the market.

To this end the invention resides in a pair of plates of spring metal shaped so as to have hand-sections and blades that are offset from the hand-sections, the plates being riveted or otherwise secured together at the end of the hand-sections in such manner that the blade-sections normally spring away from each other but are free to be sprung toward each other when the article is to be used to scrape up and grasp a portion of the peel of the vegetable to be removed, as more particularly hereinafter pointed out.

Figure 1:
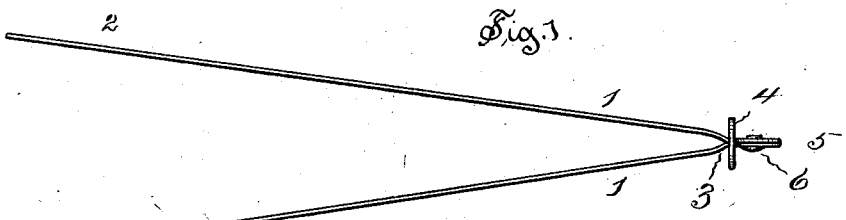
Figure 2:
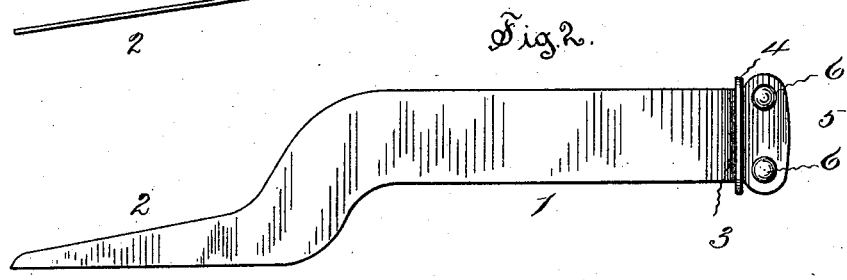
Figure 3:
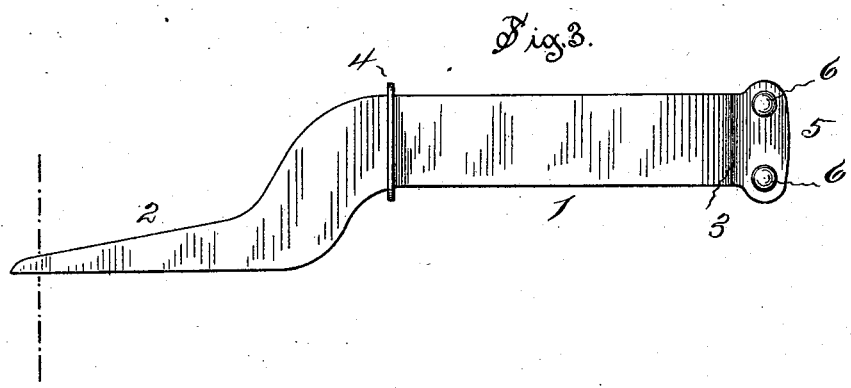
Figure 4:
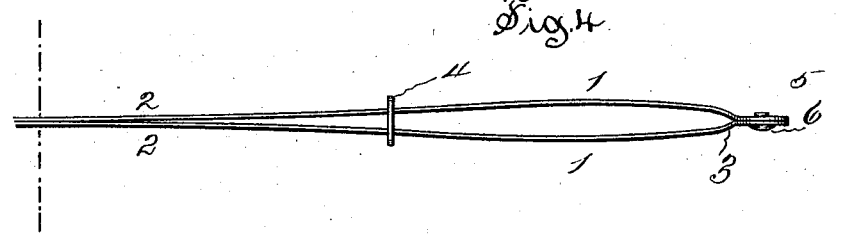

Referring to the accompanying drawings, Figure 1 is a view looking at the top edge of the article with the blades sprung open. Fig. 2 is a side view of the same. Fig. 3 is a view looking at the top edge with the blades held closed. Fig. 4 is a side view of the article in this latter condition, and Fig. 5 is a greatly-enlarged section of the blades near the points.

The article is formed of two plates, preferably stamped to shape of spring-steel, with somewhat wide hand-sections 1 and blade-sections 2 that are offset or extend in a different line from the hand-sections, so that when the article is being used the fingers of the hand that grasps the hand-sections need not come in close proximity with the hot vegetable being peeled. These two plates are riveted or otherwise secured together at the end of the hand-sections, and they are so bent or sprung near the place where they are held together, as at 3, that the elasticity of the metal normally tends to keep the plates apart at an angle with each other with the pointed ends of the blade-sections pointing obliquely from each other, as shown in Fig. 1. This bending of the plates near where they are riveted together is to such an extent that when the article is being used and the hand-sections are squeezed together by the fingers against the resilience of the spring metal the blades will come together at the points first, as shown in Fig. 3, further squeezing, of course, causing the blades to make contact or come together for a more or less longer distance back of the points, according to the force of the pressure of the hand that squeezes them together. The lower or bottom edges of the blade-sections are preferably straight and are formed so as to readily scrape the skin of the vegetable to be peeled.

Figure 5:
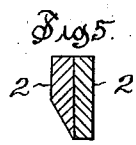

One of the blades is usually made with a square bottom edge, while the other is usually ground or sharpened away on a bevel on the outside, as shown in Fig. 5. This shape of the edge of the blades leaves one corner of both blades in such a condition that the skin of the vegetable may be readily scraped without liability of cutting into the meat of the vegetable in the same manner as would result from the use of the ordinary paring-knife or potato-scraper.

A link or bail is slipped over the plates and it may be moved freely along the hand-sections for drawing the blades together and keeping the points closed, so that the article will not occupy much space when it is laid away and not have points sticking out in a direction that would be liable to cause accidents.

When it is desired to use the article, the link is slipped back to the position shown in Figs. 1 and 2, allowing the blades to spring apart.

The plates desirably have a head 5 a little wider than the width of the hand-sections, so that the link will not slip off from that end of the hand-sections, and this also provides a wider body of metal for holding the rivets 6 that fasten the plates together.

The link is preferably made of such a size that it can be slipped over the point ends of the blades when they are squeezed very closely together and the link is turned a little diagonally; but when the link is once slipped around the offset portion of the plates onto the hand-sections it will not of itself come off, for the spring of the metal of the plates holds it against removal.

This article can be constructed very cheaply, for the plates may be easily stamped to shape with the hand-sections and the pointed blade-sections from a flat sheet of steel or other suitable metal having the desired elasticity. These two plates are quickly riveted together at one end and the desired amount of bend to spring them apart may be given when the plates are stamped to shape. The clasping-link is also easily and cheaply stamped to shape and then readily and quickly slipped upon the blades in such manner that it can be slipped back to allow the blades to spring apart or be slipped forward to draw and hold them together.

The article is convenient for use, it occupies but little space, and the plates are so shaped and so stand apart that the skin of the vegetable to be peeled can be easily scraped up without danger of cutting into the body or meat of the vegetable. When portions are scraped up, the two spring-blades are instantly squeezed together, so as to grasp and hold the raised portions of the skin between the points for tearing the skin away from the vegetable. The blades are offset from the hand-sections, so that the lower edges may be used without bringing the fingers of the hand into uncomfortable nearness to the hot vegetable, and the blades can be readily cleaned after use.

I claim as my invention—

1. A vegetable-peeler consisting of a pair of thin flat plates stamped to shape of spring sheet metal, each plate having a wide hand-section extending longitudinally in one direction, a section extending at an angle with the hand-section, and a blade-section extending in the same direction as the hand-section and having an extended scraping edge along the inside of the bottom of the blade-section, said plates being secured together flatwise by fastenings at the end of the hand-sections and sprung apart so as to normally stand at an angle with each other, substantially as specified.

2. A vegetable-peeler consisting of a pair of thin flat plates stamped to shape of spring sheet metal, each plate having a wide hand-section extending longitudinally in one direction, a section extending at an angle with the hand-section, and a blade-section extending in the same direction as the hand-section and having an extended scraping edge along the inside of the bottom of the blade-section, said plates being secured together flatwise by fastenings at the end of the hand-sections and sprung so as to normally stand at an angle with each other, and a link adapted to slide freely along the hand-sections of the plates, substantially as specified.

GEORGE J. CAPEWELL.

Witnesses:
   H. R. WILLIAMS,
   SCOTT H. SMITH.